United States Patent
Dei et al.

(10) Patent No.: US 10,816,037 B2
(45) Date of Patent: Oct. 27, 2020

(54) SEALS FOR LINEAR GUIDES

(71) Applicants: NITTA CORPORATION, Osaka (JP); THK CO., LTD., Tokyo (JP)

(72) Inventors: Takehito Dei, Nara (JP); Yoji Ishizaki, Nara (JP); Yoshiharu Kiyohara, Nara (JP); Kenichiro Aoki, Nara (JP); Yasuhiro Aoki, Nara (JP)

(73) Assignees: NITTA CORPORATION, Osaka (JP); THK CO., LTD., Tokyo (JP)

(*) Notice: Subject to any disclaimer, the term of this patent is extended or adjusted under 35 U.S.C. 154(b) by 0 days.

(21) Appl. No.: 16/365,493

(22) Filed: Mar. 26, 2019

(65) Prior Publication Data

US 2019/0219101 A1 Jul. 18, 2019

Related U.S. Application Data

(63) Continuation of application No. PCT/JP2016/078662, filed on Sep. 28, 2016.

(51) Int. Cl.
  *F16C 29/08* (2006.01)
  *F16C 29/06* (2006.01)
  *F16C 33/74* (2006.01)

(52) U.S. Cl.
  CPC .......... *F16C 33/74* (2013.01); *F16C 29/0633* (2013.01); *F16C 29/08* (2013.01)

(58) Field of Classification Search
  CPC .............. F16C 29/0633; F16C 29/0635; F16C 29/0654; F16C 29/08; F16C 29/086; F16C 33/6622; F16C 33/6648; F16C 33/723; F16C 33/74

USPC ...... 384/15, 13, 43, 44–45, 50, 49; 277/404, 277/530, 532, 540, 569, 411
See application file for complete search history.

(56) References Cited

U.S. PATENT DOCUMENTS

| | | | | | |
|---|---|---|---|---|---|
| 5,492,413 | A | * | 2/1996 | Tsukada | F16C 29/0647 384/15 |
| 5,678,927 | A | * | 10/1997 | Yabe | F16C 29/0635 384/13 |
| 5,769,543 | A | * | 6/1998 | Tsukada | F16C 29/0609 384/13 |

(Continued)

FOREIGN PATENT DOCUMENTS

| | | |
|---|---|---|
| CN | 102132053 A | 7/2011 |
| JP | 06-346919 A | 12/1994 |

(Continued)

OTHER PUBLICATIONS

Notification of Reasons for Refusal, dated Mar. 5, 2019, for Japanese Application No. 2015-166298, 9 pages (with machine generated English translation).

(Continued)

*Primary Examiner* — Marcus Charles
(74) *Attorney, Agent, or Firm* — Seed IP Law Group LLP

(57) ABSTRACT

A seal member for a linear guide including a guide rail and slider movably set on the guide rail through rolling elements, the seal member, attached to the slider, configured to seal an opening of a gap between the guide rail and slider, the seal member includes: fibers having been impregnated with rubber or resin, wherein a sliding contact part of said seal member, which is in sliding contact with the guide rail, is made of the fibers.

7 Claims, 5 Drawing Sheets

(56) References Cited

U.S. PATENT DOCUMENTS

| | | | | |
|---|---|---|---|---|
| 5,772,333 | A * | 6/1998 | Yabe | F16C 29/086 384/13 |
| 6,705,430 | B2 * | 3/2004 | Michioka | B23Q 11/0875 184/5 |
| 7,740,406 | B2 * | 6/2010 | Kakei | F16C 29/0635 384/13 |
| 8,403,562 | B2 * | 3/2013 | Geka | F16C 29/065 384/13 |
| 8,740,460 | B2 * | 6/2014 | Murata | F16C 29/086 277/404 |
| 8,956,047 | B2 * | 2/2015 | Tanaka | F16C 29/0633 277/349 |
| 9,482,273 | B2 * | 11/2016 | Matsumoto | F16C 29/086 |
| 10,054,160 | B1 * | 8/2018 | Wang | F16C 29/0669 |
| 2011/0138942 | A1 | 6/2011 | Murata | |
| 2012/0073396 | A1 * | 3/2012 | Kawaguchi | F16C 29/0652 74/424.82 |

FOREIGN PATENT DOCUMENTS

| | | |
|---|---|---|
| JP | 11-294453 A | 10/1999 |
| JP | 2007-211900 A | 8/2007 |
| JP | 2007-285479 A | 11/2007 |
| JP | 2008-240925 A | 10/2008 |
| JP | 2011-007324 A | 1/2011 |
| WO | 2010/023836 A1 | 3/2010 |

OTHER PUBLICATIONS

First Office Action dated Jan. 10, 2020, in corresponding Chinese Application No. 201680088646.7, 10 pages [with English translation].

Notice of Examination Opinion dated Jun. 3, 2020, in corresponding Taiwan Patent Application No. 105131661, 11 pages [with English translation].

* cited by examiner

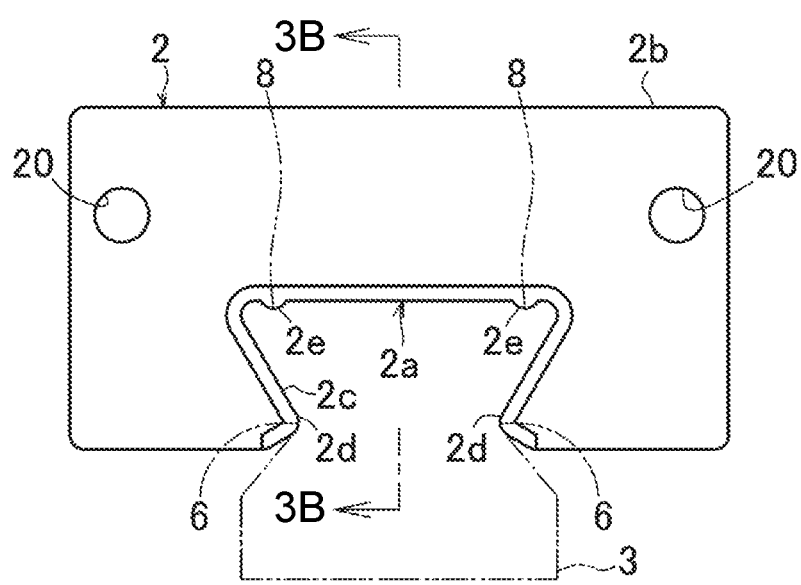
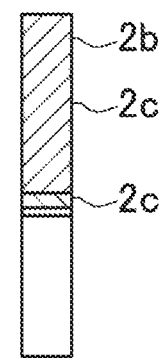
FIG. 3A
FIG. 3B

SEALS FOR LINEAR GUIDES

CROSS REFERENCE TO RELATED APPLICATIONS

This is a continuation application of International Patent Application No. PCT/JP2016/078662 filed on Sep. 28, 2016, of which full contents are incorporated herein by reference.

BACKGROUND

Technical Field

The present disclosure relates to a seal member attached to a linear guide for machine tools, industrial machines, and the like.

Description of the Related Art

Conventionally, there has been a linear guide including a guide rail and a slider movably set on the guide rail with the aid of rolling elements. The linear guide has a gap between the guide rail and the slider. If foreign substances such as dust or chips get into the gap, they prevent the rolling elements from rolling smoothly. Usually, the slider has seal members attached to its front and back ends, in an axial direction (longitudinal direction), to seal the gap between the guide rail and the slider so as to prevent the entry of such foreign substances.

Patent Document 1, e.g., describes a seal member for a linear guide having a seal lip, in slidable contact with a guide rail, made of lubricant-containing rubber or synthetic resin. By such a seal member, the entry of foreign substances into the gap between the guide rail and the slider could be prevented, and by virtue of the lubricant-containing rubber or synthetic resin used for the seal lip slidably contacting the guide rail, the need for external-lubricant supply has been eliminated.

PRIOR ART DOCUMENT

Patent Document

Patent Document 1: Japanese Unexamined Patent Application Publication No. H6-346919.

Problem to be Solved

Regarding the seal member for the linear guide disclosed in Patent Document 1 described above, however, it has been requested that the seal lip be pressed, with at least a predetermined level of force, against the guide rail for improving the sealability to such an extent that the entry of minute foreign substances into the gap between the guide rail and the slider is prevented, which has resulted in a problem of the increase in sliding resistance and, as a consequence, the decrease in slidability.

BRIEF SUMMARY

In view of the above-described problems, there is provided the present disclosure whose objective is to provide a seal member for a linear guide capable of restraining the entry of minute foreign substances into a gap between a guide rail and a slider while reducing the sliding resistance of the seal member with respect to the guide rail.

Means for Solving Problems

[1] The present disclosure provides a seal member for a linear guide including a guide rail and slider movably set on the guide rail through rolling elements, the seal member, attached to the slider, configured to seal an opening of a gap between the guide rail and slider, the seal member comprising: fibers having been impregnated with rubber or resin, wherein a sliding contact part of said seal member, which is in sliding contact with the guide rail, is made of the fibers.

According to the above configuration [1], the sliding contact part of the seal member, which is in sliding contact with the guide rail, is made of fibers having been impregnated with rubber or resin. Such a seal member is capable of further reducing the sliding resistance of the slider with respect to the guide rail in comparison with the assumed case that a seal member made merely of rubber or resin would be used, even when the seal member is used in a state that the sliding contact part is so pressed against the guide rail as to prevent the entry of minute foreign substances into the gap between the guide rail and slider. In other words, two problems in a mutually contradictory relation—restraining the entry of minute foreign substances into the gap between the guide rail and slider, and reducing the sliding resistance when the slider moves with respect to the guide rail in an axial direction—can be simultaneously solved.

[2] The present disclosure may provide a seal member for a linear guide including a guide rail and slider movably set on the guide rail through rolling elements, the seal member, attached to the slider, configured to seal an opening of a gap between the guide rail and slider, the seal member comprising: a reinforcing plate; and fibers having been impregnated with rubber or resin affixed to the reinforcing plate, wherein a sliding contact part of said seal member, which is in sliding contact with the guide rail, is made of the fibers having been impregnated with rubber or resin.

According to the above configuration [2], similar effects to those achieved by the above configuration [1] can be achieved. Besides, according to the above configuration [2], the reinforcing plate serves the purpose of maintaining the form of the fibers having been impregnated with rubber or resin. By virtue of the maintained form of the sliding contact part made of such fibers, in particular, a stable sealability can be expected.

[3] The present disclosure may provide a seal member for a linear guide including a guide rail and slider movably set on the guide rail through rolling elements, the seal member, attached to the slider, configured to seal an opening of a gap between the guide rail and slider, the seal member comprising: a layered structure including a first layer made of fibers having been impregnated with rubber or resin, and a second layer made of a reinforcing plate, wherein a sliding contact part of said seal member, which is in sliding contact with the guide rail, is also of the layered structure.

According to the above configuration [3], the sliding contact part of the seal member, which is in sliding contact with the guide rail, includes a first layer made of fibers having been impregnated with rubber or resin, and a second layer made of a reinforcing plate. Such a seal member is capable of further reducing the sliding resistance of the slider with respect to the guide rail in comparison with the assumed case that a seal member made merely of rubber or resin would be used, even when the seal member is used in a state that the sliding contact part is so pressed against the guide rail as to prevent the entry of minute foreign substances into the gap between the guide rail and slider. In other words, two problems in a mutually contradictory relation—restraining the entry of minute foreign substances into the gap between the guide rail and slider, and reducing the sliding resistance when the slider moves with respect to the guide rail in an axial direction—can be simultaneously solved. In addition, when the slider moves on the guide rail, the deflection generated in the sliding contact part of the first layer in a sliding direction is restrained by the second layer, which is made of the reinforcing plate and attached to one-side surface of the first layer. This ensures sufficient sealability even if the sliding contact part is pressed, with a lower level of force, against the guide rail.

[4] The present disclosure may provide the seal member for the linear guide in the above configuration [3], wherein the layered structure further includes a third layer made of felt or foam material, and the sliding contact part of said seal member, which is in sliding contact with the guide rail, is also of the layered structure further including the third layer.

According to the above configuration [4], by causing the third layer made of felt or foam material to be impregnated with lubricant in advance, such a third layer can supply the lubricant to the sliding contact part of the first and second layers without the need for supplying any other lubricant.

BRIEF DESCRIPTION OF THE SEVERAL VIEWS OF THE DRAWINGS

For more thorough understanding of the present disclosure and advantages thereof, the following descriptions should be read in conjunction with the accompanying drawings in which:

FIG. 3A depicts a front view of the seal member for the linear guide in the first embodiment;

FIG. 3B depicts a cross-sectional view of the seal member for the linear guide according to FIG. 3A, viewed along line 3B-3B in FIG. 3A;

DETAILED DESCRIPTION

Hereafter, a seal member for a linear guide as a first embodiment according to the present disclosure will be described with reference to the drawings.

Figure 1:
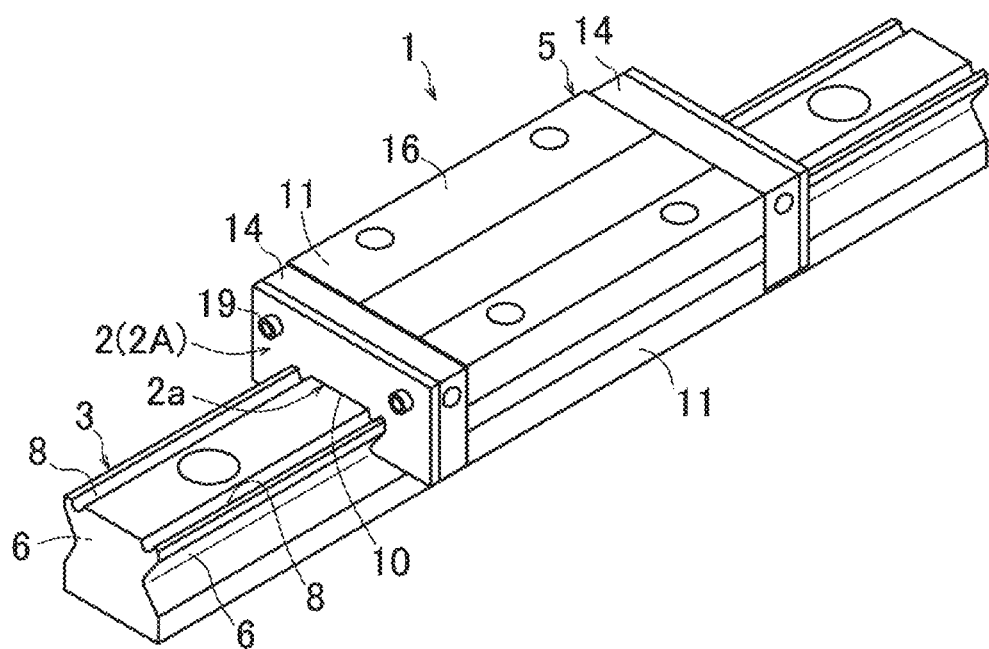
FIG. 1 depicts a perspective view of a linear guide and seal member in a first or second embodiment according to the present disclosure.
Figure 2:
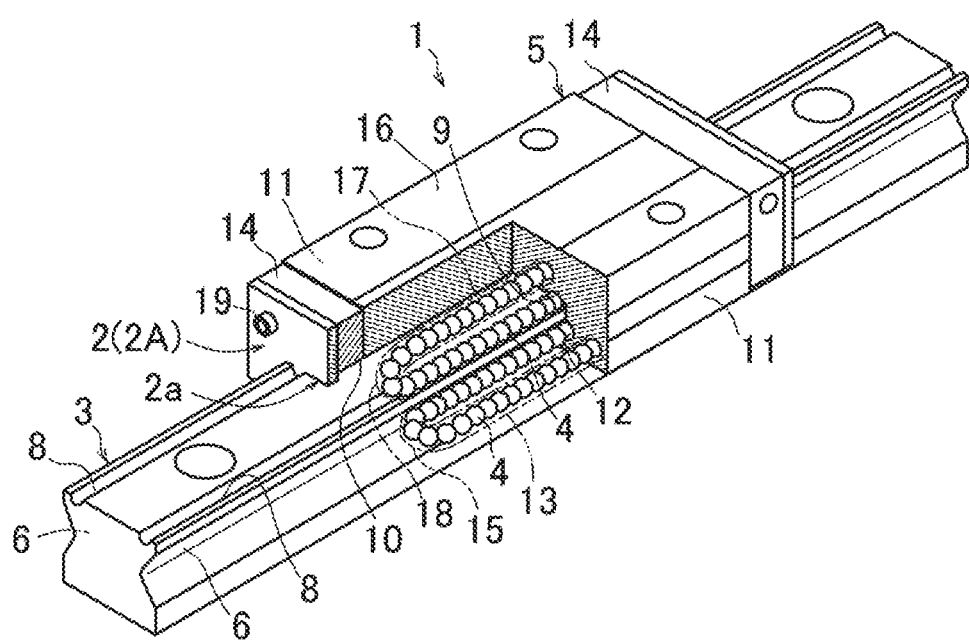
FIG. 2 depicts a perspective view of the linear guide and seal member in the first or second embodiment along with a cutaway view of the slider showing balls as rolling elements inside the slider.

The linear guide (1) illustrated in FIGS. 1 and 2 includes, as main components: a seal member (2); a guide rail (3); and a slider (5) set on the guide rail (3) so as to be movable along the guide rail (3) with the aid of balls (4) as rolling elements.

The guide rail (3) extending linearly has rail-side rolling element grooves (6) formed along an axial direction on both of its lateral-side surfaces. In addition, the guide rail (3) has rail-side rolling element grooves (8) formed along an axial direction on its top surface at both lateral sides.

The slider (5) in a substantially rectangular appearance has a concave (10), to be fitted loosely with the guide rail (3), formed in its lower central part. The slider (5) has sleeve portions (11) formed at both lateral sides of the concave (10), respectively, and such sleeve portions (11) have their respective slider-side rolling element grooves (12) formed on their inner surfaces, and such slider-side rolling element grooves (12) face their respective rail-side rolling element grooves (6) of the guide rail (3) in a state that the slider (5) is set on the guide rail (3). In such a state, each of spaces defined between the rail-side rolling element grooves (6) and the slider-side rolling element grooves (12) facing each other is loaded with many balls (4) as rolling elements in a rollable manner. Further, both of the sleeve portions (11) of the slider (5) have ball return paths (13) formed along an axial direction in their thickness sections, respectively. Still further, the slider (5) is provided, at its front and back ends, with endcaps (14) each having a substantially C-shape view taken along an axial direction (longitudinal direction). Such endcaps (14) have formed therein U-shape curved paths (15) causing the rolling element grooves (6, 12) and the ball return paths (13) to communicate with each other, thereby allowing the balls (4) to circulate in endless paths, in a state that the slider (5) is set on the guide rail (3).

The slider (5) has slider-side rolling element grooves (9) formed on a bottom surface of an upper portion (16) relative to its lower central part, and such slider-side rolling element grooves (9) face their respective rail-side rolling element grooves (8) in a state that the slider (5) is set on the guide rail (3). In such a state, each of spaces defined between the rail-side rolling element grooves (8) and the slider-side rolling element grooves (9) facing each other is loaded with many balls (4) as rolling elements in a rollable manner. Further, the upper portion (16) of the slider (5) also has ball return paths (17) formed along an axial direction in its sickness section. Still further, similarly, the endcaps (14) have formed therein U-shape curved paths (18) causing the rolling element grooves (8, 9) and the ball return paths (17) to communicate with each other, thereby allowing the balls (4) to circulate in endless paths, in a state that the slider (5) is set on the guide rail (3).

The seal member (2) is attached to at least one of front and back end surfaces of the slider (5) with bolts (19) so as to seal an opening of a gap defined between the guide rail (3) and the slider (5). The seal member (2) in this embodiment includes: a supporting plate (2b) made of rubber, resin, or metal not containing fibers; and a fiber-containing sealing layer (2c) made of fibers having been impregnated with rubber or resin formed over a region from the supporting plate (2b) to the sliding contact part (2a) that is in sliding contact with the guide rail (3), e.g., as shown in FIG. 3. The fiber-containing sealing layer (2c) may be formed at least at the sliding contact part (2a). It is to be noted that FIG. 3 uses a solid line to indicate a boundary between the supporting plate (2b) and the fiber-containing sealing layer (2c); however, such a solid line is not shown as a clearly visualized actual boundary but shown merely for explanation purposes.

If a view of the seal member (2) is taken along an axial direction as shown in (a) of FIG. 3, its sliding contact part (2a) in sliding contact with the guide rail (3) has a cross-sectional shape corresponding to that of the guide rail (3). In particular, in a state that the seal member (2) is attached to the slider (5), the sliding contact part (2a) is in a constantly tight contact with the guide rail (3), and is pressed against the guide rail (3) with pressure of a level enough to prevent the entry of minute foreign substances (whose size would cause deterioration in rolling of the rolling elements) into the gap between the guide rail (3) and the slider (5). In other words, the sliding contact part (2a) and all other parts are set in size and shape appropriate for such purposes. As a matter of course, the sliding contact part (2a) is configured such that: its shape also corresponds to that of the rail-side rolling element grooves (6, 8); its convex parts (2d) can be in sliding contact with and be fitted to the rail-side rolling element grooves (6); and its convex parts (2e) can be in sliding contact with and be fitted to the rail-side rolling element grooves (8).

The contour of the seal member (2) other than the sliding contact part (2a) has no strict restriction on size or shape. In this embodiment, the contour of the seal member (2) other than the sliding contact part (2a) has a size and shape, substantially C-shape as a whole, corresponding to those of the endcap (14). Reference numeral "20" in FIG. 3 indicates through holes for inserting the bolts (19).

The fiber-containing sealing layer (2c) can be made of, e.g., aramid fiber, nylon, urethane, cotton, silk, linen, acetate, rayon, fluorine-containing fiber, polyester, and the like, and has been impregnated with rubber or resin. It may be made of, e.g., short or long fibers.

As a result of impregnating fibers with rubber or resin, rubber or resin material is enabled to fill gaps among the fibers and bond such fibers together so that the bonded fibers can serve as the fiber-containing sealing layer (2c). Further, as a result of impregnating fibers with rubber or resin, the wear generated due to the mutual friction among the fibers can be reduced, and still further, the resistance to the wear generated on a surface of the fiber-containing sealing layer (2c) due to the friction between the fiber-containing sealing layer (2c) and the guide rail (3) can be improved.

It is to be noted that the rubber may be that with which the fibers can be subjected at least to the impregnation treatment. As such types of rubber, the followings may be used in a neat form or in a form denatured in various ways: e.g., urethane rubber, nitrile rubber, silicon rubber, fluororubber, acrylic rubber, ethylene-propylene rubber, butyl rubber, isoprene rubber, chlorinated polyethylene rubber, epichlorohydrin rubber, hydrogenated nitrile rubber, chloroprene rubber, polybutadiene rubber, styrene-butadiene rubber, natural rubber, and the like. Each of these types of rubber may be used alone, or a plurality of types of rubber selected therefrom may be used in a blended form. Further, the rubber may contain appropriate amounts of traditional compounding ingredients for rubber, such as vulcanizing agent, vulcanizing accelerator, antioxidant, softener, plasticizer, filler, colorant, and the like as well as solid lubricants such as graphite, silicone oil, fluorine powder, molybdenum disulfide, or the like for enhancing the lubricity of the fiber-containing sealing layer (2c). Still further, the above types of rubber may be replaced by or combined with thermoplastic or thermosetting resin such as acrylic resin, polyester resin, urethane resin, vinyl chloride resin, polypropylene, polycarbonate, polyethylene terephthalate resin, fluorine resin, polyethylene, acrylonitrile-styrene resin, acrylonitrile-butadiene-styrene resin, polystyrene resin, polyvinyl chloride, polyvinylidene chloride, polyvinyl acetate, nylon, alkyd resin, phenolic resin, epoxy resin, polyphenylene sulfide resin, and the like.

When impregnating fibers with rubber or resin as described above, it is preferable that the rubber or resin be dissolved by a solvent or another means into a liquid state before dipping the predetermined fibers (short fibers, long fibers, or fabric) in the liquid. As a precursor of the fiber-containing sealing layer (2c), the sheet-like fabric made of the fibers may be used. This fabric is impregnated with rubber or resin in the same way as described above.

The fabric may be, e.g., non-woven fabric made of irregularly tangled fibers, regularly-formed woven, knitted fabric, or the like. These fabrics are characterized by facilitating impregnation (easier handling) with rubber and the like, and further facilitating adhesion to the surface of the shaft structure described below in comparison with those made of fibers (short or long fibers) only, because these fabrics are in sheet form.

The fabric may preferably be stretchable to some extent. By virtue of such stretchiness, when the fabric is formed in shape so as to be in line with the rail-side rolling element grooves (6, 8), there can be achieved the effects that: a surface of the fabric can easily be shaped in accordance with the form of the rail-side rolling element grooves (6, 8); and a surface of the fiber-containing sealing layer (2c) is hardly wrinkled with reduced creases and uniformly finished. As a result, the sliding resistance generated between the guide rail (3) and the seal member (2) can be further reduced.

Effects Achieved by Seal Member for Linear Guide in First Embodiment

According to the above configuration, the sliding contact part (2a) of the seal member (2), which is in sliding contact with the guide rail (3), is made of fibers having been impregnated with rubber or resin. Such a seal member (2) is capable of further reducing the sliding resistance of the slider (5) with respect to the guide rail (3) in comparison with the assumed case that a seal member made merely of rubber or resin would be used, even when the seal member (2) is used in a state that the sliding contact part (2a) is so pressed against the guide rail (3) as to prevent the entry of minute foreign substances into the gap between the guide rail (3) and the slider (5). In addition, the fiber-containing sealing layer (2c) having fibers is improved in durability in comparison with the assumed seal member made merely of rubber or resin.

Subsequently, a seal member for a linear guide as a second embodiment according to the present disclosure will be described with reference to the drawings. It is to be noted that the configuration other than the seal member is similar to that described in the first embodiment, and therefore, explanations of it will be omitted, hereafter.

Figures 4A, 4B:
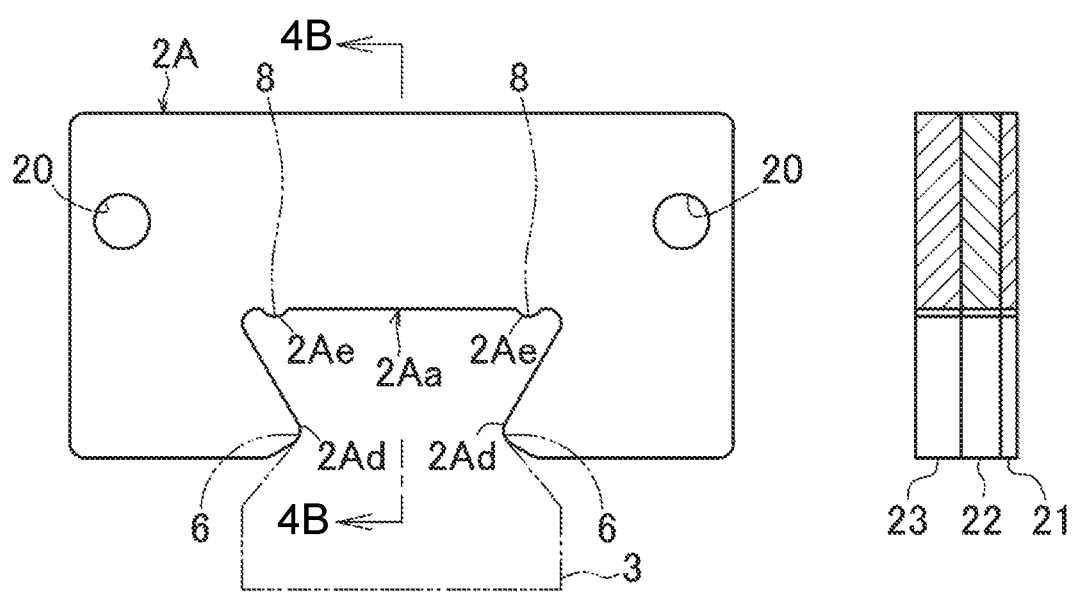
FIG. 4A depicts a front view of the seal member for the linear guide in the second embodiment.
FIG. 4B depicts a cross-sectional view of the seal member for the linear guide according to FIG. 4A, viewed along Section B B. line 4B-4B in FIG. 4A.

As shown in FIG. 4, the seal member (2A) in a second embodiment have a layered structure including a first layer (21) made of fibers having been impregnated with rubber or resin, a second layer (22) made of resin or metal, and a third layer (23) made of felt. The seal member (2A) is attached to at least one of the front and back end surfaces of the slider (5) with bolts (19). Upon attachment, the first layer (21) occupies the closest position to the slider (5), followed by the second layer (22), and further followed by the third layer (23).

The first layer (21) made of fibers having been impregnated with rubber or resin is the same in material and production method as the fiber-containing sealing layer (2c) described in the first embodiment. Such a member, serving as a sealing material like rubber, has an advantage for reducing the sliding resistance with respect to the guide rail (3) in comparison with the assumed seal member made merely of rubber or resin as described as being compared to the first embodiment.

The second layer (22) made of resin or metal serves as a reinforcing plate for maintaining the overall form of the seal member (2A). In addition, the second layer (22) also serves as support for the sliding contact part (2Aa) of the first layer (21), when the slider (5) moves on the guide rail (3), so that the deflection generated in the sliding contact part (2Aa) in a sliding direction is restrained by the second layer (22). The second layer (22) may be made at least of resin or metal. The resin excels in adherability, however, and therefore, it improves the durability of the layered structure of the seal member (2A).

The third layer (23) made of felt, impregnated with lubricant in advance, can supply that lubricant to the sliding contact parts (2Aa) of the first and second layers (21, 22) without the need for supplying any other lubricant. The felt may be made of aromatic polyamide, carbon fiber, polyester fiber, flame-resistant fiber, natural fiber, or any combination thereof; usually, such felt is formed as non-woven fabric. It is to be noted that the third layer (23) may also be made of foam material instead of felt on the grounds that the effects similar to those of the felt could be achieved by foam material capable of containing lubricant.

In this embodiment, if a view of the first to third layers (21-23) is taken along an axial direction, they are substantially the same in contour as one another, and each layer (21-23) has a sliding contact part (2Aa) that is in sliding contact with the guide rail (3). In particular, the sliding contact part (2Aa) of the first layer (21) is set in size and shape in such a manner that, when the seal member (2A) is attached to the slider (5), the sliding contact part (2Aa) is in a constantly tight contact with the guide rail (3), and is pressed against the guide rail (3) with pressure of a level enough to prevent the entry of minute foreign substances (whose size would cause deterioration in rolling of the rolling elements) into a gap between the guide rail (3) and the slider (5). The sliding contact parts (2Aa) of the second and third layers (22, 23) are not intended for sealing, and therefore, it is preferable that they are so set in size and shape as to be in a light contact with the guide rail (3). The sliding contact part (2Aa) of the seal member (2A) is also configured such that: its convex parts (2Ad) can be in sliding contact with and be fitted to the rail-side rolling element grooves (6); and its convex parts (2Ae) can be in sliding contact with and be fitted to the rail-side rolling element grooves (8).

The contour of the seal member (2A) other than the sliding contact part (2Aa) has no strict restriction on size or shape. In this embodiment, the contour of the seal member (2A) other than the sliding contact part (2Aa) has a size and shape, substantially C-shape as a whole, corresponding to those of the endcap (14). Reference numeral "20" in FIG. 4 indicates through holes for inserting the bolts (19).

The seal member (2A) of the layered structure described above can be produced by various known methods. It can be produced by, e.g., applying adhesive to a pair of surfaces defined between the first layer (21) and the second layer (22) as well as to a pair of surfaces defined between the second layer (22) and the third layer (23) so as to laminate them together as layers, and thereafter, subjecting the laminated layers to press molding and punching into a shape like a shape shown in (a) of FIG. 4.

Effects Achieved by Seal Member for Linear Guide in Second Embodiment

According to the above configuration, the sliding contact part (2Aa) of the seal member (2A), which is in sliding contact with the guide rail (3), includes a layered structure including a first layer (21) made of fibers having been impregnated with rubber or resin and a second layer (22) serving as a reinforcing plate. Such a seal member (2A) is capable of further reducing the sliding resistance the slider (5) with respect to the guide rail (3) in comparison with the assumed case that a seal member made merely of rubber or resin would be used, even when the seal member (2A) is used in a state that the sliding contact part (2Aa) is so pressed against the guide rail (3) as to prevent the entry of minute foreign substances into the gap between the guide rail (3) and the slider (5). Further, when the slider (5) moves on the guide rail (3), the sliding contact part (2Aa) of the first layer (21) is supported by the second layer (22) to restrain the deflection generated in the sliding contact part (2Aa) of the first layer (21) in a sliding direction. This ensures sufficient sealability even if the sliding contact part (2Aa) is pressed, with a lower level of force, against the guide rail (3). Still further, the first layer (21) of the seal member (2A) having fibers is improved in durability in comparison with the assumed seal member made merely of rubber or resin. Still further, the third layer (23) made of felt or foam material to be impregnated with lubricant in advance, such a third layer can supply the lubricant to the sliding contact part (2Aa) of the first layer (21), which is in sliding contact with the guide rail (3), without the need for supplying any other lubricant.

Up to this point, explanations of embodiments according to the present disclosure are made with reference to the drawings, and it is needless to say, however, that specifically explained configurations are not limited to such embodiments. The present disclosure is defined in scope not by the above explanations but by the claims, and involves all modifications falling under the scope of the claims and their equivalents.

In the above-described embodiments, e.g., the linear guide has rolling element grooves on the lateral-side surfaces as well as the top surface of the guide rail; however, a linear guide according to the present disclosure is not limited to the above-described types of linear guides capable of being applied with the seal member according to the present disclosure but is open to various different types of linear guides.

Further, in the first embodiment, the fibers for the "fiber-containing sealing layer (2c)" have been impregnated with rubber or the like; however, the present disclosure has no particular restrictions on such fibers if there would be any others capable of having being impregnated with rubber or the like as well as having a relatively lower sliding resistance with respect to the metal surface. The fiber-containing sealing layer (2c) may also be formed through the use of a layer involving sheet-like fabric. For the fabric, e.g., canvas, velvet, denim, woven fabric, or denim fabric may be adopted. Moreover, the fibers may also be formed to be stretchable in at least one of a longitudinal direction and a lateral direction.

Figure 5A:
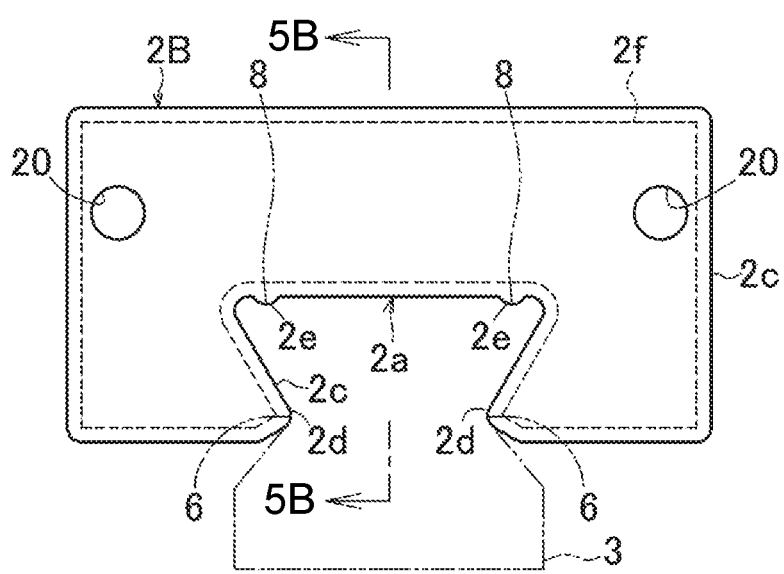
FIG. 5A depicts a front view of a seal member for a linear guide in a modified first embodiment according to the present disclosure.
Figure 5B:
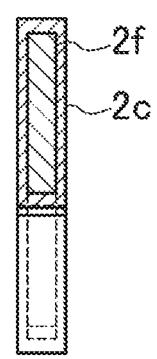
FIG. 5B depicts a cross-sectional view of the seal member for the linear guide according to FIG. 5A, viewed along line 5B-5B in FIG. 5A.

Still further, in the first embodiment, for the fiber-containing sealing layer (2c) of the seal member (2), there is adopted only the sliding contact part (2a) in sliding contact with the guide rail (3) and its vicinity; but for the supporting plate (2b) of the seal member (2), there is adopted all the other part. Other configurations may be possible, e.g., a seal member (2B) in FIG. 5 includes: a fiber-containing sealing layer (2c) made of fibers having been impregnated with rubber or resin; and a reinforcing plate (2f) made of resin or metal for maintaining the form of the fiber-containing sealing layer (2c) obtained such that a body, as a whole, of the reinforcing plate (2f) is covered, in an affixable manner, with the fiber-containing sealing layer (2c). Such a seal member (2B) also has convex parts (2d, 2e) and through holes (20) in a similar manner to those of the seal member (2) in FIG. 3. In FIG. 5, the body, as a whole, of the reinforcing plate (2f) is covered with the fiber-containing sealing layer (2c), and may be formed at least at the sliding contact part (2a) in sliding contact with the guide rail (3), and may be formed at the other material such as rubber, resin, or metal not containing fibers. By virtue of such a seal member (2B), the reinforcing plate (2f) serves the purpose of maintaining the form of the fiber-containing sealing layer (2c), especially the form of the sliding contact part (2a), in particular, a stable sealability can be expected.

Still further in the second embodiment, the seal member (2A) is of a layered structure including the first to third layers (21-23); however, the third layer (23) made of felt or foam material may be omitted under any circumstances that any other lubricant is supplied.

Still further in the second embodiment, the seal member (2A) is obtained by laminating the first layer (21) and the second layer (22) such that the former is arranged on one surface of the latter, and laminating the third layer (23) and the second layer (22) such that the former is arranged on the other surface of the latter. As a result, the seal member (2A) has the first, second, third layers (21, 22, 23) laminated together in a far-away order of distance from the slider (5). However, alternative order may be adopted, e.g., the second, first, third layers (22, 21, 23), the third, second, first layers (23, 22, 21), the third, first, second layers (23, 21, 22), laminated together in a far-away order of distance from the slider (5).

REFERENCE NUMERALS

1 Linear guide
2, 2A, 2B Seal member
2a, 2Aa Sliding contact part
2f Reinforcing plate
2c Fiber-containing sealing layer (fibers impregnated with rubber or resin)
3 Guide rail
4 Balls (rolling elements)
5 Slider
21 First layer
22 Second layer
23 Third layer The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A seal member for a linear guide including a guide rail and a slider configured to move along the guide rail via rolling elements, the seal member coupled to the slider and configured to seal an opening of a gap between the guide rail and the slider, the seal member comprising:
　a plurality of stretchable fibers having gaps therebetween; and
　a rubber material impregnated into the plurality of stretchable fibers,
　wherein the gaps are filled with the rubber material and the plurality of stretchable fibers are bound together by the rubber material in a shape of a side of the guide rail, and
　wherein a sliding contact part of the seal member, in sliding contact with the guide rail is made of the fibers impregnated with the rubber material.

2. A seal member for a linear guide including a guide rail and a slider configured to move along the guide rail via rolling elements, the seal member coupled to the slider and configured to seal an opening of a gap between the guide rail and the slider, the seal member comprising:
　a reinforcing plate; and
　a plurality of stretchable fibers having gaps therebetween and penetrated with rubber such that the plurality of stretchable fibers are impregnated by and bonded together by rubber in a shape of a guide-rail side, the plurality of stretchable fibers being affixed to the reinforcing plate,
　wherein a sliding contact part of said seal member, which is in sliding contact with the guide rail, is made of the fibers.

3. A seal member for a linear guide including a guide rail and a slider configured to move along the guide rail via rolling elements, the seal member coupled to the slider and configured to seal an opening of a gap between the guide rail and the slider, the seal member comprising:
　a layered structure, including:
　　a first layer made of stretchable fibers having gaps therebetween, the gaps penetrated with rubber such that the stretchable fibers are impregnated by and bonded together by rubber with a shape of a guide-rail side; and
　　a second layer made of a reinforcing plate,
　wherein a sliding contact part of the seal member, in sliding contact with the guide rail is made of the layered structure.

4. The seal member for the linear guide according to claim 3, wherein the layered structure further includes a third layer made of felt or foam material, and
　the sliding contact part of the seal member, is made of the layered structure including the third layer.

5. A linear guide, comprising:
　a guide rail having a side with a shape;
　a slider configured to move along the guide rail via rolling elements; and
　a seal member coupled to the slider with the seal member configured to seal an opening of a gap between the guide rail and the slider, the seal member including:
　　stretchable fibers having gaps therebetween, the gaps penetrated with rubber such that the stretchable fibers are impregnated by and bonded together by rubber in the shape of the side of the guide rail; and
　　a sliding contact part in sliding contact with the guide rail and made of the fibers.

6. A linear guide, comprising:
　a guide rail;
　a slider configured to move along the guide rail via rolling elements; and a seal member coupled to the slider with the seal member configured to seal the opening of the gap between the guide rail and slider, the seal member including:
a reinforcing plate;
stretchable fibers having gaps therebetween, the gaps penetrated with rubber such that the stretchable fibers are impregnated by and bonded together by rubber in a shape of a side of the guide rail, the stretchable fibers being affixed to the reinforcing plate; and
a sliding contact part in sliding contact with the guide rail made of the stretchable fibers.

7. A linear guide, comprising:
a guide rail;
a slider configured to move along the guide rail via rolling elements; and
a seal member coupled to the slider with the seal member configured to seal an opening of a gap between the guide rail and the slider, the seal member including:
a layered structure, including:
a first layer made of stretchable fibers having gaps therebetween, the gaps penetrated with rubber such that the fibers are impregnated by and bonded together by rubber in the gaps with a shape of a side of the guide rail; and
a second layer made of a reinforcing plate; and
a sliding contact part in sliding contact with the guide rail and made of the layered structure.

* * * * *